United States Patent [19]
Berlioux

[11] 4,190,142
[45] Feb. 26, 1980

[54] TORSION-DAMPING ASSEMBLIES WITH TWO-PART HUBS E.G. FOR FRICTION CLUTCHES

[75] Inventor: Jacques Berlioux, Sucy-en-Brie, France

[73] Assignee: Societe Anonyme Francaise du Ferodo, Paris, France

[21] Appl. No.: 880,578

[22] Filed: Feb. 23, 1978

[30] Foreign Application Priority Data

Feb. 25, 1977 [FR] France ............................. 77 05529

[51] Int. Cl.² .............................................. F16D 3/14
[52] U.S. Cl. ................................................. 192/106.2
[58] Field of Search .............. 192/106.2, 106.1, 107 C

[56] References Cited

U.S. PATENT DOCUMENTS

| | | | |
|---|---|---|---|
| 2,058,575 | 10/1936 | Drude | 192/106.2 X |
| 2,176,696 | 10/1939 | Wemp | 192/106.2 X |
| 2,293,781 | 8/1942 | Thelander | 192/106.2 X |
| 2,316,820 | 4/1943 | Thelander | 192/106.2 X |
| 2,745,268 | 5/1956 | Reed | 192/106.2 X |
| 3,995,726 | 12/1976 | Gennes | 192/106.2 X |

Primary Examiner—Benjamin Wyche
Attorney, Agent, or Firm—Charles E. Brown

[57] ABSTRACT

A torsion damping assembly for a friction clutch is disclosed. The assembly comprises two coaxial members and circumferentially disposed springs interposed therebetween. One of the members comprises two hub parts each of which has a radially extending elemental web having openings or cutouts for the springs which bear along opposed edges thereof. The elemental webs are parallel to each other and formed in one piece with their respective hub parts. The other member comprises, for example, two annular plate members which are fixed to each other by a weld or a rivets and have recesses cooperable with the cutouts or openings in the element webs for accommodating the springs. The hub parts may be fixed for rotation with each other by suitable means. When used for a friction clutch a friction plate is fixed to one or both of the annular plate members. The webs may axially enclose the annular plate members on the annular plate members may axially enclose the webs.

15 Claims, 2 Drawing Figures

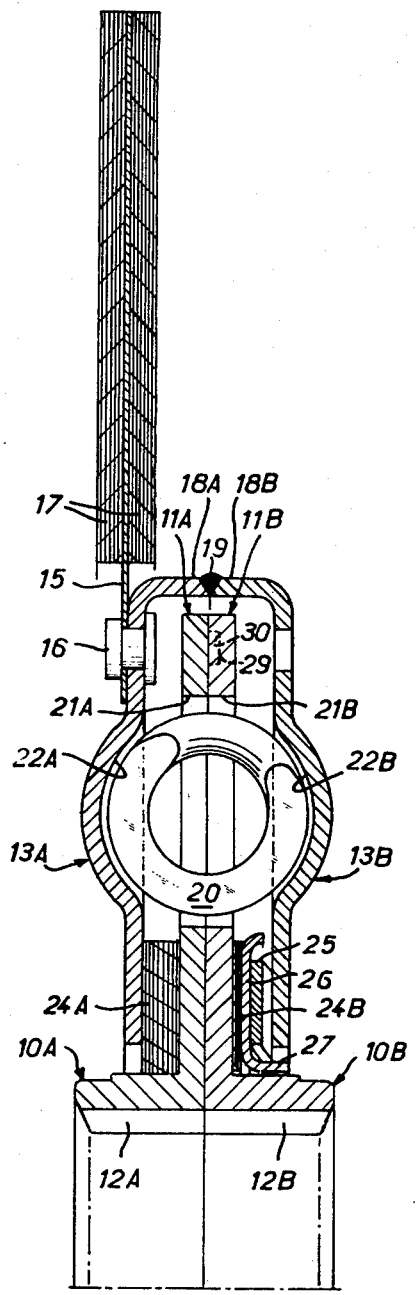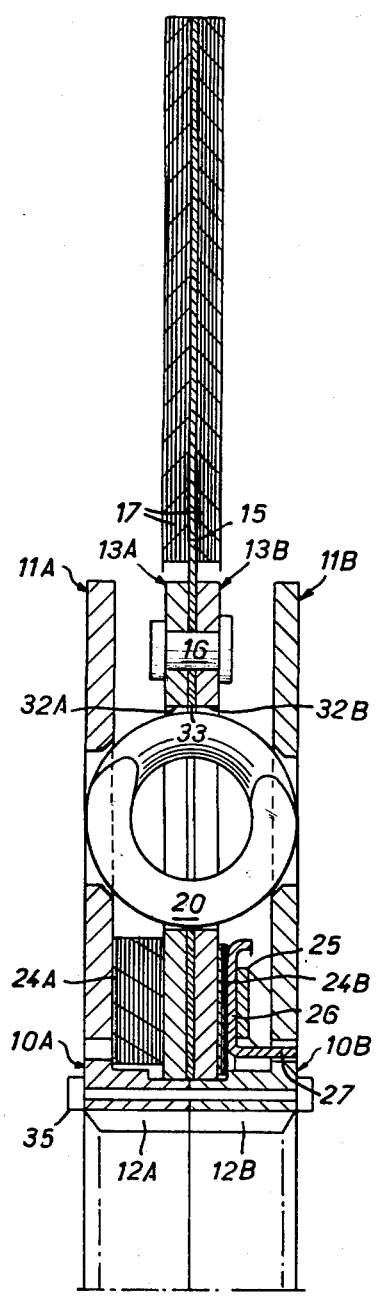

4,190,142

TORSION-DAMPING ASSEMBLIES WITH TWO-PART HUBS E.G. FOR FRICTION CLUTCHES

BACKGROUND OF THE INVENTION

The present invention relates generally to torsion damping assemblies comprising two coaxial members rotatably mounted relative to each other with circumferentially disposed resilient means interposed therebetween, including a first member comprising a hub and a web extending radially from the hub, and a second member comprising at least one annular plate member disposed annularly about the hub, parallel to the web, the resilient means comprising springs disposed in part in cutouts in the web and in part in openings or cutouts in the annular plate member or members.

Such torsion damping assemblies may be used for torsion damping hubs of friction clutch assemblies for motor vehicles.

In such torsion damping assemblies which are intended to be fitted on heavy vehicles a problem arises, namely, the springs are interposed between two coaxial members of such an assembly, bearing on the hub web of one of the members against an edge defining the openings in the web in which they are accommodated. It is important that the edge has a sufficient thickness; in other words, the hub web must have a thickness great enough for the hub web to be able to transmit to the hub the torque applied by the springs.

Now the cutouts in the hub web in which the springs are accommodated are usually punched, by present day punching techniques do not usually enable punching thick webbed hubs. Accordingly the maximum possible hub web axial thickness it is possible to obtain by punching is limited.

SUMMARY OF THE INVENTION

A general object of the present invention is the provision of an arrangement which makes it possible to overcome this drawback and to exceed this limit, as well as other advantages.

A more specific object of the present invention is the provision of a torsion damping assembly of the foregoing type characterized in that a first coaxial member, that is the hub and its web, is formed axially in two separate parts each having a hub part having an elemental web extending radially outwardly and in one piece therewith, the elemental webs of the hub parts having, face to face, cutouts or openings against the edges of which the springs may bear.

Each of the two elemental webs transmits half the torque which is applied to the combined elemental webs so that for a given amount of torque transmitted it is possible to form each of the elemental webs with an axial thickness less than half that necessary in the case of a single equivalent hub web.

On account of the relatively short axial thickness of the elemental web of each hub part of the torsion damping assembly according to the invention, the elemental webs of the hub parts readily admit of the punching operation necessary to cutout the openings or cutouts which must be provided for accommodating the associated springs.

It is thus practically possible to double the heretofore permissible axial thickness for such a punching operation.

COMPARISON WITH PRIOR ART

There has certainly been contemplated, namely in U.S. Pat. No. 2,176,696, issued on July 3, 1937, a welded sheet metal friction clutch construction in which the web of the hub comprises two relatively thin sheet metal flanges fitted together. Yet in such a construction the flanges making up the web of the hub are not formed in one piece with the associated hub which bears them; rather, they are securd thereto by welding. Consequently the torque to be transmitted from the hub web to the corresponding web passes in practice through a zone where the parts are welded together which restricts the maximum permissible torque and therefore precludes the utilization of such a torsion damping assembly for a torsion damped friction clutch for use on a heavy vehicle.

Further the welding itself gives rise to technical problems: the resultant parts may be of reduced strength and/or develop deformations.

By contrast, in the torsion damping assembly according to the invention each elemental web is formed in one piece with the associated hub part which carries it and is therefore devoid of these drawbacks.

It has also been contemplated, namely in U.S. Pat. No. 2,124,059 to provide a friction clutch construction in which the hub is formed axially of two hub parts each carrying a friction facing.

In addition to the fact that it is not a friction clutch with a torque damping assembly there is a relative angular play between the two friction plates which is not so in the torsion damping assembly according to the invention, in which, quite to the contrary, any eventual angular play between the two hub parts is eliminated or reduced to a minimum, which play may be the cause of accidental jamming of the hub parts on a spined shaft on which the are usually received; and moreover, when the used for a friction clutch assembly, the friction plate thereof is in a single piece and not joined to the hub.

Furthermore, in constructions for such friction clutches, the arrangements according to the invention are advantageously appropriate for hubs with identical webs, so that the friction linings used must be fixed in rotation with the rotary member of such a friction clutch assembly comprising such a hub or it must be fixed to the rotary member having at least one annular plate member apart from the hub. There results a reduction of various related costs.

Features and advantages of the invention will be brought out in the description which follows, given by way of example, with reference to the accompanying drawings.

BRIEF DESCRIPTION OF THE DRAWINGS

FIG. 1 is an axial cross-sectional view of half of a torsion damping assembly embodying the present invention; and FIG. 2 is a view similar to that of FIG. 1 for a modified embodiment of the torsion damping assembly embodying the invention.

DETAILED DESCRIPTION OF THE PREFERRED EMBODIMENTS

The drawings illustrate, by way of example, the application of the present invention to the construction of torsion damping hubs of friction clutches for a motor vehicles. In general the torsion damping assembly of such a damped clutch plate assembly comprises two coaxial members mounted for relative rotation with respect to each other against the force of circumferentially disposed spring means operatively interposed therebetween.

According to the invention a first such member is axially formed of two distinct parts each having a hub part 10A, 10B with a radially extending elemental web 11A, 11B at its outer periphery and formed in one piece therewith. The hub parts 10A, 10B are axially aligned with each other and are provided at their inner peripheries, in registry with one another, with splines 12A,12B adapted to couple them for rotation with a shaft, not shown, usually a driven shaft.

In the embodiment illustrated in FIG. 1 the elemental webs 11A,11B are disposed at the axial ends of the hub parts facing each other so that they are joined back to back to each other; alternatively the hub parts obviously may not be joined together.

At the same time, in the embodiment of FIG. 1 the second coaxial member of the torsion damping assembly concerned comprises two annular plate members 13A,13B which enclose the elemental webs 11A,11B of the first coaxial member and are fixed axially with respect to each other by means of axially spacing and connecting means axially extending beyond the elemental webs.

One of the annular plate members 13 in the illustrated embodiment carries a radially projecting friction plate 15 which is secured to it by rivets 16, and is in one piece. Along its peripheral regions the friction plate supports friction linings or facings 17 on its opposed faces.

In the embodiment of FIG. 1 the axially spacing and connecting means fixing the annular plate members 13A, 13B to each other comprise axial projections which are part of the annular plate members themselves and welds uniting the annular plate members together.

In each of the annular plate members 13A,13B and in practice both of them, as shown, the axial projections extend radially beyond the periphery of the elemental webs 11A,11B and form at the outer periphery thereof axially extending continuous circular flanges 18A,18B respectively so that a weld 19, which may or may not be continuous, established from the facing edges of the opposed axially extending flange, runs along the median zone of the entire periphery of the unit comprised of the two annular plate members 13A,13B.

In the illustrated embodiment the axially extending flanges 18A,18B on the annular plate members 13A,13B are respectively formed in one piece with each other.

According to inillustrated embodiments the edges by which the axially extending flanges 18A,18B meet each other are provided with complementary mating teeth. The flanges are fixed to each other, e.g. by spot welding, and/or one of the annular plate member 13A,13B is provided with such an axial flange having a sufficient axial extent to be able to cooperate with the other of the annular plate members.

In any event, in a manner known per se, the circumferentially disposed resilient means interposed between the coaxial members of the associated torsion damping assembly comprise a plurality of springs 20 which extend tangentially of a circumferential line are disposed in part in openings or cutouts 21A,21B in the elemental webs 11A,11B and in part in the recesses 22A,22B formed, e.g., by punching, in the annular plate members 13A,13B.

The openings or cutouts 21A,21B in the elemental webs 11A,11B of the hub are disposed with the elemental webs of the hub facing each other in registry; the springs 20 can bear at the same time against the edges the cutouts or openings 21A,21B in which they are accommodated.

Likewise the springs 20 may bear together against the radial edges of the recesses 22A,22B in the annular plate members 13A,13B in which they are accommodated.

Friction means are in a manner known per se also interposed axially between the coaxial members making up the torsion damping assembly.

In the illustrated embodiment between the annular plate member 13A and the elemental web 11B a friction washer 24B and between the annular plate member 13B and the elemental web of the hub, a friction washer 24B urged by an axially acting resilient ONDUFLEX washer 25 bears against the annular plate member 13B.

In the illustrated embodiment the friction washer 24B is carried by a tab washer 26 fixed for rotation with annular plate member 13B by axial tabs 27.

As is well known the friction plate 15 is adapted to be clamped axially between two plates fixed in rotation with a shaft, in practice the driving shaft.

When a torque couple is applied to the friction disc 15, the latter transmits it to the annular plate members 13A,13B and then in turn, via springs 20, to the elemental webs 11A,11B on the hub and therefore to the hub parts 10A,10B.

In so far as torque transmission is concerned, the result is the same as if the elemental webs 11A,11B of the hub were formed in one piece in which the web of a single hub has an axial thickness which is equal to the sum of their axial thicknesses.

The upper limit of the torque couple that the elemental webs 11A,11B of the hub is adapted to transmit therefore depends on the sum of their axial thicknesses.

But these elemental webs 11A,11B of the hub may be advantageously machined separately of each other, especially for the punching step for cutting out the cutouts or openings 21A,21B which aperture them.

It follows that, on account of the reduced axial dimension of each individual web, the punching step is facilitated.

Preferably, however, the splines 12A,12B on the hub parts 10A,10B carrying the elemental webs 11A,11B are executed together from one of the parts of the hub to the other, for instance, in the course of a continuous broaching operation common to both parts of the hub which avoids effecting a relative indexing operation which is difficult to perform on the hub parts 10A,10B later on.

In practice, for the same objective, the two component parts of the coaxial member concerned, that is, the hub parts 10A,10B carrying the elemental webs 11A,11B are fixed for rotation with each other.

The rotational connection may be only temporary until the parts in question are assembled on the driven shaft on which they are to be keyed for rotation. In this case the rotational connection may be provided, for example, by a dummy shaft on which the parts are received until they are ultimately positioned on the shaft concerned. Instead the parts may be held temporarily in place by dabs of adhesive or spot welds at spaced locations.

Yet, preferably, the parts in question are fixed for rotation permanently to avoid in the course of operation by the action of a differential torque couple to which one of them may be subjected, a change in their relative angular position, with the concommitant risk that the splines 12A,12B on the hub parts 10A,10B on the shaft on which they are received may become jammed, precluding the free sliding movement of the hub part on the shaft.

For instance, as schematically illustrated in dotted lines in FIG. 1, the elemental web 11A on the hub part may have axially protruding pegs 29 at spaced locations received in corresponding recesses 30 in the elemental web 11B of the hub part.

According to an alternative embodiment illustrated in FIG. 2, the elemental webs 11A and 11B axially enclose the annular plate members 13A and 13B. The annular plate members 13A,13B are flat and clamp the friction plate 15 therebetween. The axially spacing and connecting means which fix them axially to each other are formed as rivets 16 associated with the unit comprised of the annular plate members and the friction plate.

The recesses in the annular plate members 13A,13B for accommodating the springs 20 are simply cutouts 32A,32B in the annular plate members just as the openings or cutouts 21A,21B in the webs 13A,13B of the hub, and openings 33 are corresponding also cutout in the friction plate 15. The resultant doubling of the annular plate member into two annular plate members 13A,13B of the part of the torsion damping assembly which carries the friction plate 15 thus facilitates as does the punching of the annular plate members for cutting out the openings in the preceding embodiment for accommodating the springs 20.

Besides, in the alternative embodiment, the annular plate member 26 bearing the friction washer 24B is keyed for rotation with the elemental web 11B of the hub part 10B and the parts 10A, 10B of the hub bearing the elemental webs 11A,11B are fixed axially to each other by tie bolts 35.

Alternatively other means of fixing the elemental webs 11A,11B may be employed.

At any rate it will be noted that in the embodiment of the illustrated in FIG. 2, the parts 10A,10B of the hub are overall reversed 180° axially relative to the position of the FIG. 1 embodiment and therefore the parts of the hub utilized in the two embodiments are advantageously capable of the same fabrication thereby diminishing production costs.

The present invention is not intended to be limited to the illustrated and described embodiments by encompasses all alternatives, modifications and expedients and combinations of the various parts within the scope of the appended claims.

What is claimed is:

1. A torsion damping assembly comprising two coaxial members rotatably mounted relative to each other, and circumferentially disposed resilient means interposed between said members, a first of said members comprising two one-piece hub parts, each hub part being formed of one integral piece of metal with each hub part comprising an annular radially extending elemental web and a cylindrical inner flange integrally joined to said elemental web, said cylindrical flange having integrally formed on the inside surface thereof spline means for coupling said hub part to an axial shaft, said elemental webs having openings or cutouts facing one another, opposed edges of said elemental webs defining in part said openings or cutouts serving as bearing surfaces for said resilient means; a second of said members comprising at least one annular plate member disposed annularly around said hub parts parallel to said webs, said annular plate member having recesses formed therein and cooperating with said openings or cutouts for accommodating said resilient means.

2. An assembly according to claim 1, together with means for fixing said hub parts for rotation with each other.

3. An assembly according to claim 1, wherein said second member comprises two said annular plate members axially exclosing said webs of said first member, means for axially spacing and connecting said annular plate members to each other comprising an axial projection on at least one of said annular plate members welded to said other annular plate member.

4. An assembly according to claim 3, wherein said other annular plate member also has an axial projection.

5. An assembly according to claim 3, wherein said axial projection is provided with mating teeth for cooperation with said other annular plate member.

6. An assembly according to claim 3, wherein said axial projection on said one annular plate member comprises an axially extending continuous circular outer peripheral flange.

7. An assembly according to claim 4, wherein said axial projections comprise an axially extending continuous circular flange and said means for fixing said hub parts for rotation with each other comprises a weld running along the median zone of said second member formed by said annular plate members.

8. An assembly according to claim 7, wherein said axially extending flange on said one annular plate member is in one piece therewith.

9. An assembly according to claim 1, wherein said webs axially enclose said annular plate members, said hub parts being fixed axially to each other.

10. An assembly according to claim 1, wherein said second member comprises two annular plate members.

11. An assembly according to claim 10, for use in a friction clutch assembly, wherein a friction plate is carried by said annular plate members and clamped therebetween.

12. A torsion damping assembly for a friction clutch plate assembly, comprising two coaxial members mounted for rotatable movement relative to each other, and circumferentially disposed resilient means interposed between said members, a first of said members comprising two hub parts fixed to each other for rotation and forming axial continuations of each other, each hub part being formed of one integral piece of metal with each hub part comprising an annular radially extending elemental web and a cylindrical inner flange integrally joined to said elemental web, said cylindrical flange having integrally formed on the inside surface thereof spline means for coupling said hub part directly to an axial shaft, said elemental webs being parallel to each other, said elemental webs having openings or cutouts in registry with one another for receiving said resilient means therein, opposed ends of said openings or cutouts serving as bearings surfaces for said resilient means; a second of said members to which a friction plate is adapted to be fixed and comprising a pair of annular plate members parallel to said elemental webs and disposed annularly around said hub parts, said annular plate members having recesses formed therein cooperating with said openings or cutouts in said elemental webs for accommodating said resilient means.

13. An assembly according to claim 1, wherein said hub parts are substantially identical with each other.

14. An assembly according to claim 3, wherein said annular plate members are identical with each other.

15. An assembly according to claim 7, wherein said axial projections are disposed at the outer peripheries of their respective annular plate and arranged in axial alignment and facing relation.

* * * * *